(12) United States Patent
Azpiazu Echave

(10) Patent No.: US 11,635,013 B2
(45) Date of Patent: Apr. 25, 2023

(54) AUTOMOTIVE EXHAUST SYSTEM ISOLATOR

(71) Applicant: CIKAUTXO, S. COOP., Berriatua (ES)

(72) Inventor: Iñaki Azpiazu Echave, Markina-Xemein (ES)

(73) Assignee: CIKAUTXO, S. COOP., Berriatua (ES)

(*) Notice: Subject to any disclaimer, the term of this patent is extended or adjusted under 35 U.S.C. 154(b) by 99 days.

(21) Appl. No.: 17/066,977

(22) Filed: Oct. 9, 2020

(65) Prior Publication Data
US 2022/0010717 A1  Jan. 13, 2022

(30) Foreign Application Priority Data

Jul. 13, 2020 (EP) .................................... 20382627

(51) Int. Cl.
*F16M 11/00* (2006.01)
*F01N 13/18* (2010.01)

(52) U.S. Cl.
CPC ...... *F01N 13/1822* (2013.01); *F01N 2530/22* (2013.01)

(58) Field of Classification Search
CPC .............. F16L 55/035; F01N 13/1822; F01N 2530/22; B60K 13/04
See application file for complete search history.

(56) References Cited

U.S. PATENT DOCUMENTS

| 4,817,909 A * | 4/1989 | Deane .................. B60K 5/1241 267/152 |
| 5,829,732 A * | 11/1998 | Yamaguchi ............. F16F 1/377 267/141 |
| 6,454,236 B2 * | 9/2002 | Garaud ............... F01N 13/1822 267/152 |
| 7,883,061 B2 * | 2/2011 | Miyata .................. F16L 55/035 248/65 |
| 8,794,608 B2 * | 8/2014 | Kato ..................... F16F 1/3849 267/140.2 |

(Continued)

FOREIGN PATENT DOCUMENTS

KR  20170042040 A  4/2017
KR  102032825 B1  10/2019
(Continued)

*Primary Examiner* — Amy J. Sterling
(74) *Attorney, Agent, or Firm* — Edell, Shapiro & Finnan, LLC

(57) ABSTRACT

An automotive exhaust system isolator including an elastomeric body. The elastomeric body includes a central member having a through hole for inserting a pin of an exhaust system, and a peripheral member being configured to be coupled to a vehicle body, which surrounds the central member and is connected to the central member. The elastomeric body further includes two support arms having a first end and a second end, the first and second ends of the respective support arms being joined to the peripheral member, and the central member being connected to the two support arms by means of respective lateral bridges, so that, in use, the first ends of the support arms are positioned in an upper part of the peripheral member and the second ends are positioned in a lower part of the peripheral member, the central member being positioned between both support arms.

20 Claims, 7 Drawing Sheets

(56) References Cited

U.S. PATENT DOCUMENTS

| | | | | |
|---|---|---|---|---|
| 8,820,701 | B1* | 9/2014 | Eichinger | B63H 20/06 |
| | | | | 248/610 |
| 9,004,468 | B2* | 4/2015 | Kamei | F16F 1/3849 |
| | | | | 267/141.1 |
| 10,807,455 | B2* | 10/2020 | Kim | F16F 1/3849 |
| 2007/0018367 | A1* | 1/2007 | Kamei | F16F 3/093 |
| | | | | 267/140.3 |
| 2009/0001242 | A1* | 1/2009 | Endo | B60K 13/04 |
| | | | | 248/610 |
| 2019/0309672 | A1* | 10/2019 | Moetakef | F16L 55/035 |

FOREIGN PATENT DOCUMENTS

| | | | |
|---|---|---|---|
| WO | 2008027110 | A2 | 3/2008 |
| WO | 2018092978 | A1 | 5/2018 |

\* cited by examiner

AUTOMOTIVE EXHAUST SYSTEM ISOLATOR

CROSS-REFERENCE TO RELATED APPLICATIONS

This application relates to and claims the benefit and priority to European Application No. EP20382627.6, filed Jul. 13, 2020.

TECHNICAL FIELD

The present invention relates to an automotive exhaust system isolator for suspending a gas exhaust systems of motor vehicles.

BACKGROUND

Isolators for suspending exhaust systems of motor vehicles are known. Those isolators are configured for attaching the gas exhaust system, which is subjected to swinging, to a second component, such as the chassis of the vehicle, for example. These isolators usually are made of rubber and must withstand static loads, for example the weight of the exhaust system that hangs from the isolator, and/or dynamic loads if the exhaust system is subjected to vibrations or swinging, for example. One type of isolator can have two opposed fastening areas, usually cylindrical holes, which move away from one another when the isolator is stretched in use and move closer when the isolator is compressed in use.

In another type of isolator, a central member which has a through hole for inserting a pin of the exhaust system is moved in used, usually up and down, around a peripheral member which is able to be attached to the vehicle body. The central member and the peripheral member are joined by four support arms, two of which are disposed in the upper part of the isolator and the other two in the lower part of the isolator.

In this sense, WO2008027110A2 discloses an isolator for an automotive exhaust system comprising an elastomeric body having a central member with a through hole for inserting a pin of an exhaust system, and a peripheral member surrounding the central member and connected to said central member through four support arms, two of which are located in the upper part of the elastomeric body and the other two in the lower part of the elastomeric body.

SUMMARY

Disclosed is an automotive exhaust system isolator.

The automotive exhaust system isolator of the invention comprises an elastomeric body comprising a central member having a through hole for inserting a pin of an exhaust system, and a peripheral member surrounding the central member and connected to said central member. The peripheral member is configured to be coupled to a vehicle body.

The elastomeric body further comprises two support arms having a first end and a second end. The first and second ends of the respective support arms are joined to the peripheral member and the central member is connected to the two support arms by means of respective lateral bridges, so that, in use, the first ends of the support arms are positioned in an upper part of the peripheral member and the second ends are positioned in a lower part of the peripheral member. The central member is positioned between both support arms.

The support arms of the isolator of the invention, in use, work mainly in the direction of the supporting load exerted by the suspended exhaust system, i.e. in the vertical direction. In use the central member is moved up and down depending on the terrain on which the vehicle circulates, therefore, both support arms work under traction/compression loads instead of flexion loads, which increases the durability of the isolator compared with the isolators of the prior art of the same type.

These and other advantages and features will become evident in view of the drawings and detailed description.

DETAILED DESCRIPTION

Figure 1:
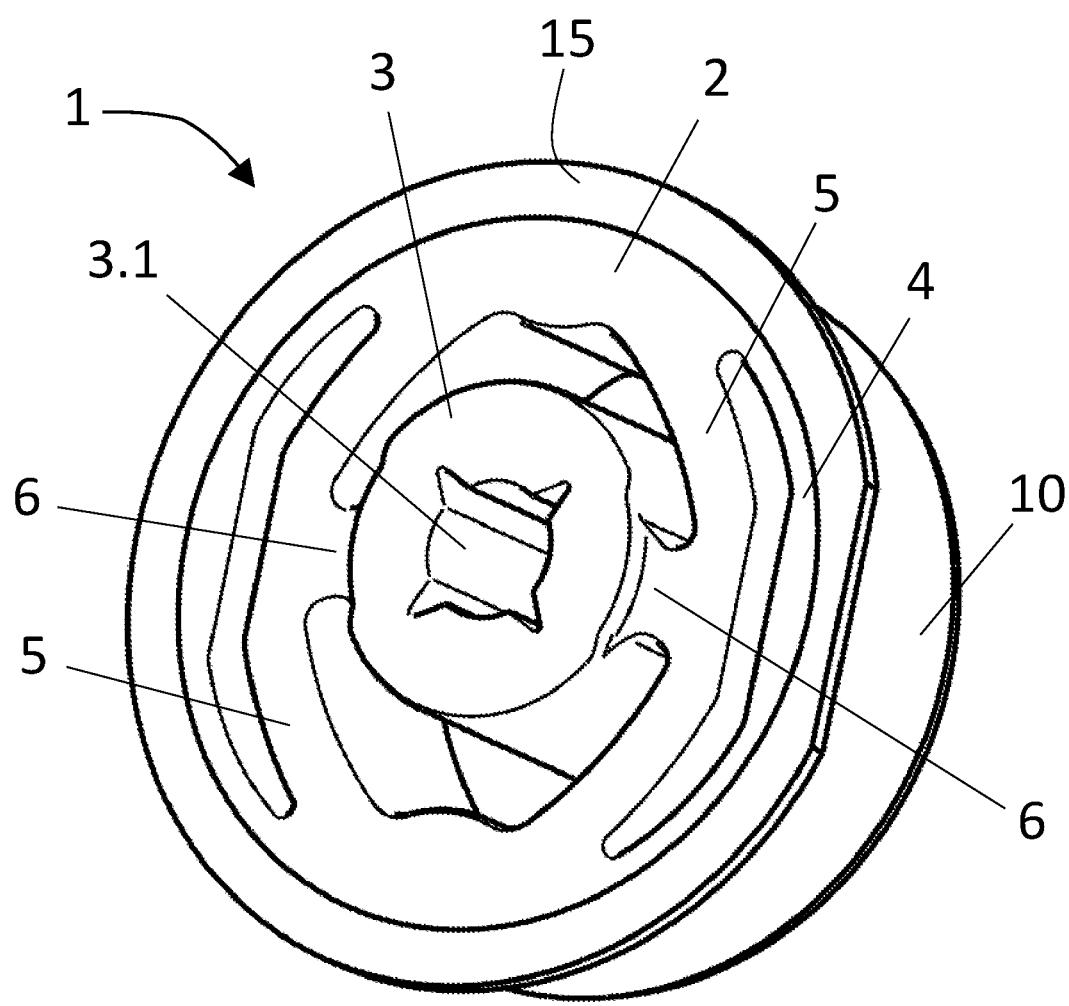
FIG. 1 shows a first perspective view of an automotive exhaust system isolator.
Figure 2:
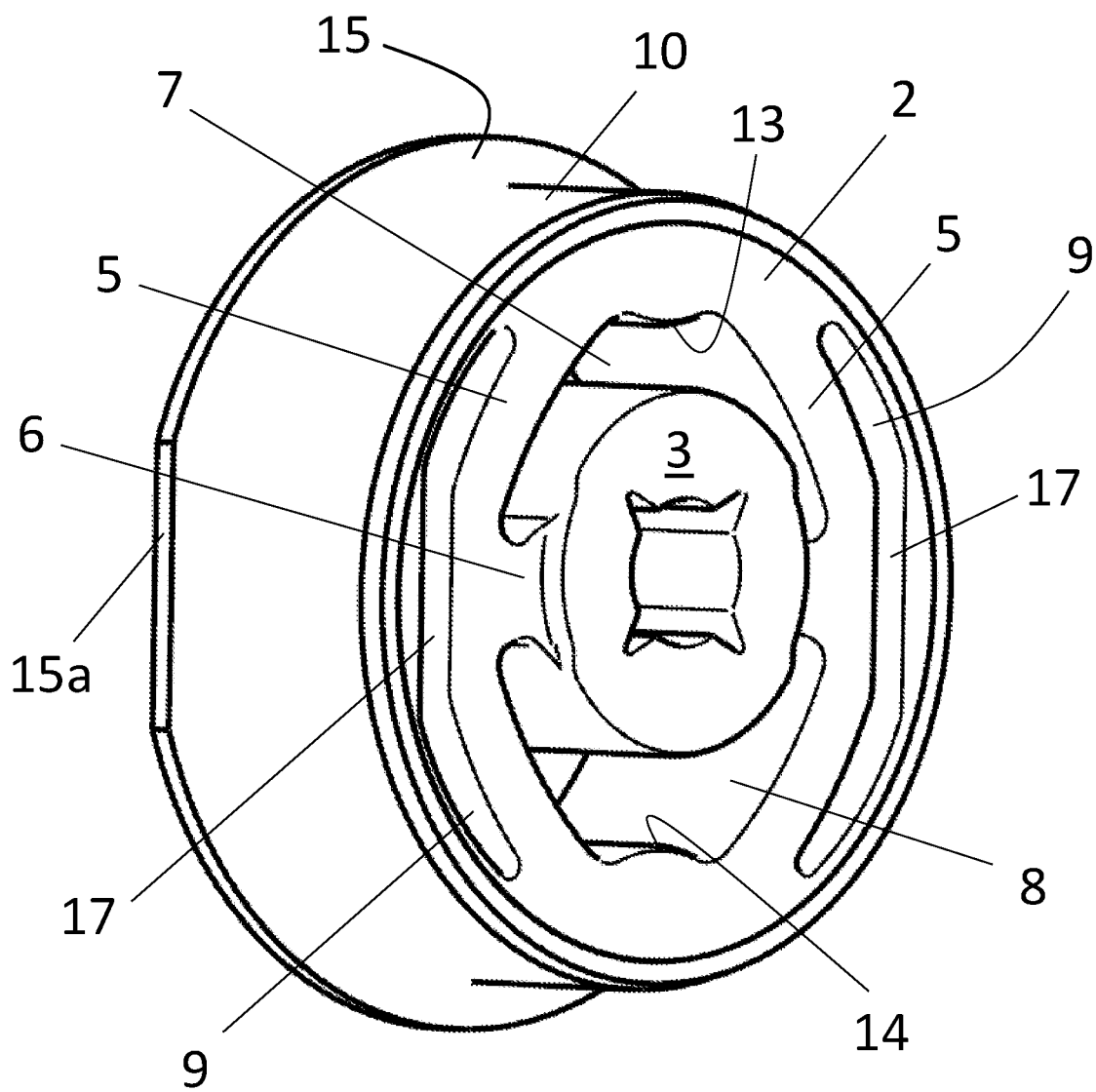
FIG. 2 shows another perspective view of the isolator of FIG. 1.

FIGS. 1 and 2 show an embodiment of the automotive exhaust system isolator 1 of the invention. The isolator 1 is the link between a vehicle body and the gas exhaust system which hangs from the isolator 1. In use the gas exhaust system of a vehicle is subjected to swinging loads, therefore the aim of the isolator 1 is to support the exhaust system while the transmission of the vibrations generated by the exhaust system towards the vehicle body is minimized.

The isolator 1 comprises an elastomeric body 2 comprising a central member 3 having a through hole 3.1 for inserting a mounting pin 12 of an exhaust system, and a peripheral member 4 surrounding the central member 3 and connected to said central member 3. The peripheral member 4 is configured to be coupled to a vehicle body.

Figure 3:
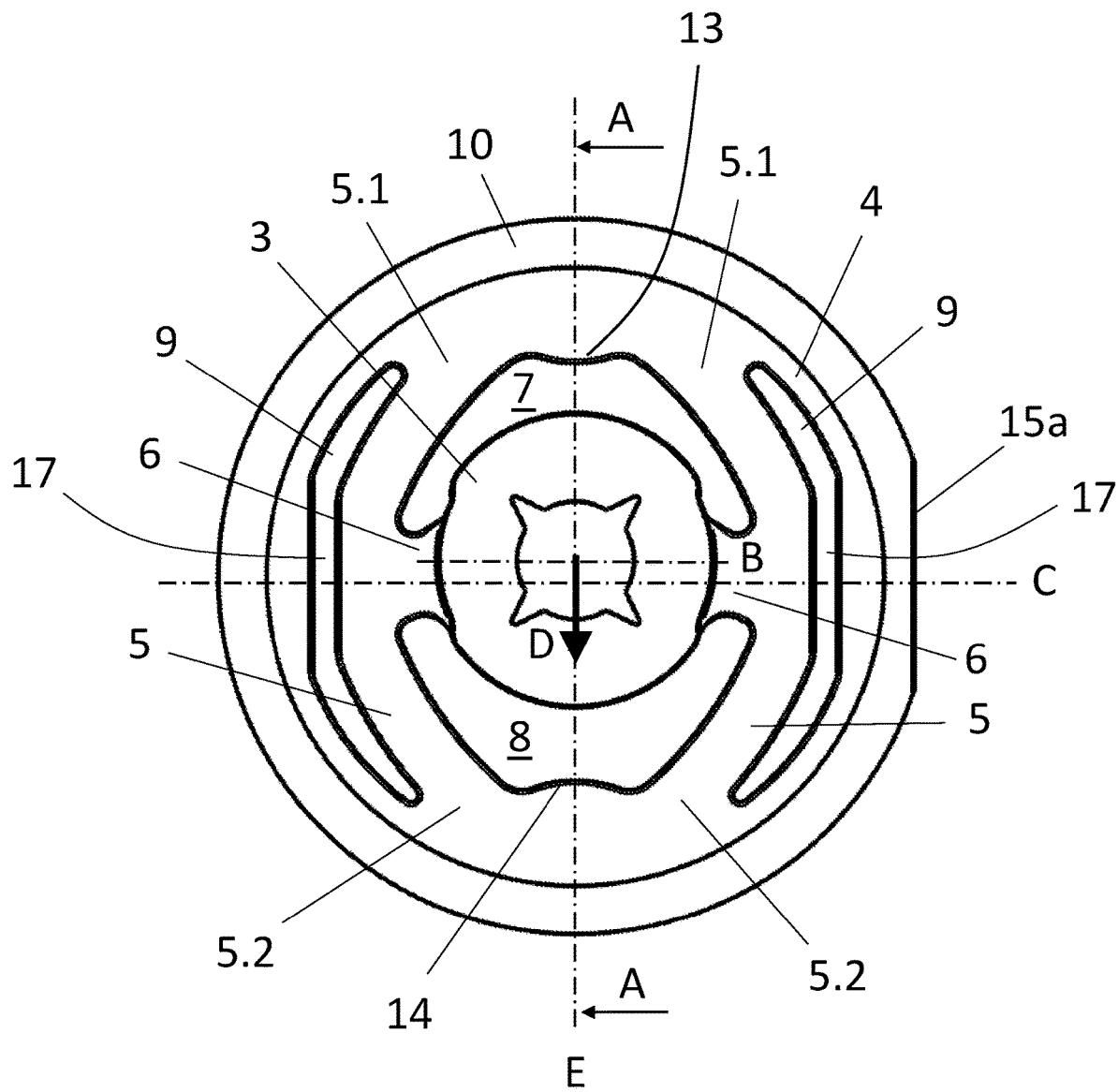
FIG. 3 shows a front view of the isolator of FIG. 1.

The elastomeric body 2 further comprises two support arms 5 having a first end 5.1 and a second end 5.2 as best shown in FIG. 3. The first and second ends 5.1 and 5.2 of the respective support arms 5 are joined to the peripheral member 4 and the central member 3 is connected to the two support arms 5 by means of respective lateral bridges 6, so that, in use, the first ends 5.1 of the support arms 5 are positioned in an upper part of the peripheral member 4 and the second ends 5.2 are positioned in a lower part of the peripheral member 4. The central member 3 is positioned between both support arms 5 as shown in FIG. 1, 2 or 3.

The support arms 5 of the isolator 1 of the invention, in use, work mainly in the direction of the supporting load, represented in FIG. 3 by arrow D, exerted by the suspended exhaust system, i.e. in the vertical direction, so that the durability of the isolator 1 is increased compared with the isolators of the prior art of the same type. In use the central member 3 is moved up and down depending on the terrain on which the vehicle circulates. The upper part of each support arm 5, i.e. the part above the lateral bridge 6, is deformed and elongated when the central member 3 is moved to the lower side of the isolator 1, i.e. is tensioned, while the opposed part, i.e. the part below the lateral bridge 6, is deformed and shortened, i.e. is compressed. When the central member 3 is moved in use to the upper side of the isolator 1 then the upper part of each support arm 5 is deformed and shortened, i.e. is compressed, and the opposed part, i.e. the part below the lateral bridge 6, is deformed and elongated, i.e. is tensioned. Therefore, both support arms 5 work under traction/compression loads instead of flexion loads, therefore, the durability of the isolator 1 is increased. When a support arm has to withstand flexion loads, the corresponding support arm is bended and therefore the loads are concentrated around the bending point which can weaken the support arm. Instead, when a support arm has to withstand traction/compression loads, as in the case of the invention, the traction/compression loads are distributed along the whole of the support arm and therefore the durability is increased.

The elastomeric body of the preferred embodiment is made of natural rubber, vulcanized rubber, thermoplastic elastomer, EPDM and/or any combination among them.

According to the preferred embodiment, the isolator 1, being in a use position and in a stable position (as in the position shown in FIG. 3), is symmetric with respect to a vertical plane. In the context of the invention, the use position is to be understood as the position in which the isolator 1 is going to be assembled in the vehicle. In this position the plane of symmetry of the isolator 1 is the vertical plane, said vertical plane being parallel to the cutting section A-A shown in FIG. 3. In the same way, the stable position is to be understood as a position in which the central member 3, where the mounting pin of the exhaust system is not inserted yet in the through hole 3.1, is in a rest position, i.e. without being displaced, as in the position shown in FIG. 3.

The first ends 5.1 and the second ends 5.2 of the respective support arms 5 are located within a segment of the peripheral member 4 between 0° and 45° from the vertical axis E, being the isolator 1 in the use position and in the stable position, as in the position shown in FIG. 3.

In the preferred embodiment, the lateral bridges 6 are joined to the center of the respective support arms 5 at one of its ends, while the other end is joined to the center of the central member 3 as shown in FIG. 3. Being the isolator 1 in the use position and in the stable position, the respective lateral bridges 6 are tilted up so that the central axis B of the central member 3 is disposed above the central axis C of the peripheral member 4, as best shown in FIG. 3. When the exhaust system is hanged from the isolator 1 through the through hole 3.1 of the central member 3, the central member 3 is displaced downwards due to the weight of the exhaust system, and therefore the central axis B of the central member 3 is also displaced, preferably until the central axis B of the central member 3 coincides with the central axis C of the peripheral member 4. The lateral bridges 6 and the central member 3 are designed to make this happen.

In a variant of the invention, each support arm 5 and the central member 3 may be joined by two lateral bridges 6, one lateral bridge 6 being joined at one end within a section of the upper part of the central member 3 and at the other end within a section of the upper part of the respective support arm 5, the second lateral bridge 6 being disposed in a lower position of the first lateral bridge 6, in such a way that the central axis B of the central member 3 is arranged above the central axis C of the peripheral member 4 when the isolator 1 is in the use position and in the stable position.

As best shown in FIG. 3, the support arms 5 of the isolator 1 of the invention have a C shape and an inverted C shape respectively, and each of them partially surrounds the central member 3. Being the isolator 1 in the use position and in the stable position, as in the position shown in FIG. 3, one support arm 5 is the mirror image of the other.

In the preferred embodiment of the invention the first ends 5.1 of the two support arms 5 are joined to each other in the upper part of the peripheral member 4 and the second ends 5.2. of the two support arms 5 are joined to each other in the lower part of the peripheral member 4. This allows for a better distribution of the loads towards the support arms 5 since a more balanced load distribution is made possible.

In the preferred embodiment of the invention an upper buffer hole 7 is formed between the upper portions of both support arms 5, i.e. above the lateral bridges 6 or above the center of the support arms 5, and between the upper part of the central member 3 and the inner side of the upper part of the peripheral member 4. Said upper buffer hole 7 runs through the elastomeric body 2 from side to side and has an inverted U shape when the isolator 1 is in the use position and in the stable position, as in the position shown in FIG. 3.

In the same way, a lower buffer hole 8 is formed between lower portion of both support arms 5, i.e. below the lateral bridges 6 or below the center of the support arms 5, and between the lower part of the central member 3 and the inner side of the lower part of the peripheral member 4. Said lower buffer hole 8 also runs through the elastomeric body 2 from side to side and has a U shape when the isolator 1 is in the use position and in the stable position, as in the position shown in FIG. 3. Being the isolator 1 in the use position and the stable position the upper buffer hole 7 is smaller than the lower buffer hole 8 but when the exhaust system is hanged from the isolator 1 through the through hole 3.1, and the vehicle being in a rest position, both upper hole 7 and lower buffer hole 8 tend to equalize in size.

The isolator 1 of the invention, according to the preferred embodiment, further comprises lateral buffer holes 9 formed between the peripheral member 4 and the corresponding support arm 5. Said lateral buffer holes 9 are through holes running through the elastomeric body 2 from side to side. As best shown in FIG. 3, the lateral buffer holes 9 have a C shape and an inverted C shape respectively. Being the isolator 1 in the use position and in the stable position, as in the position shown in FIG. 3, one lateral buffer hole 9 is the mirror image of the other.

Figure 6:
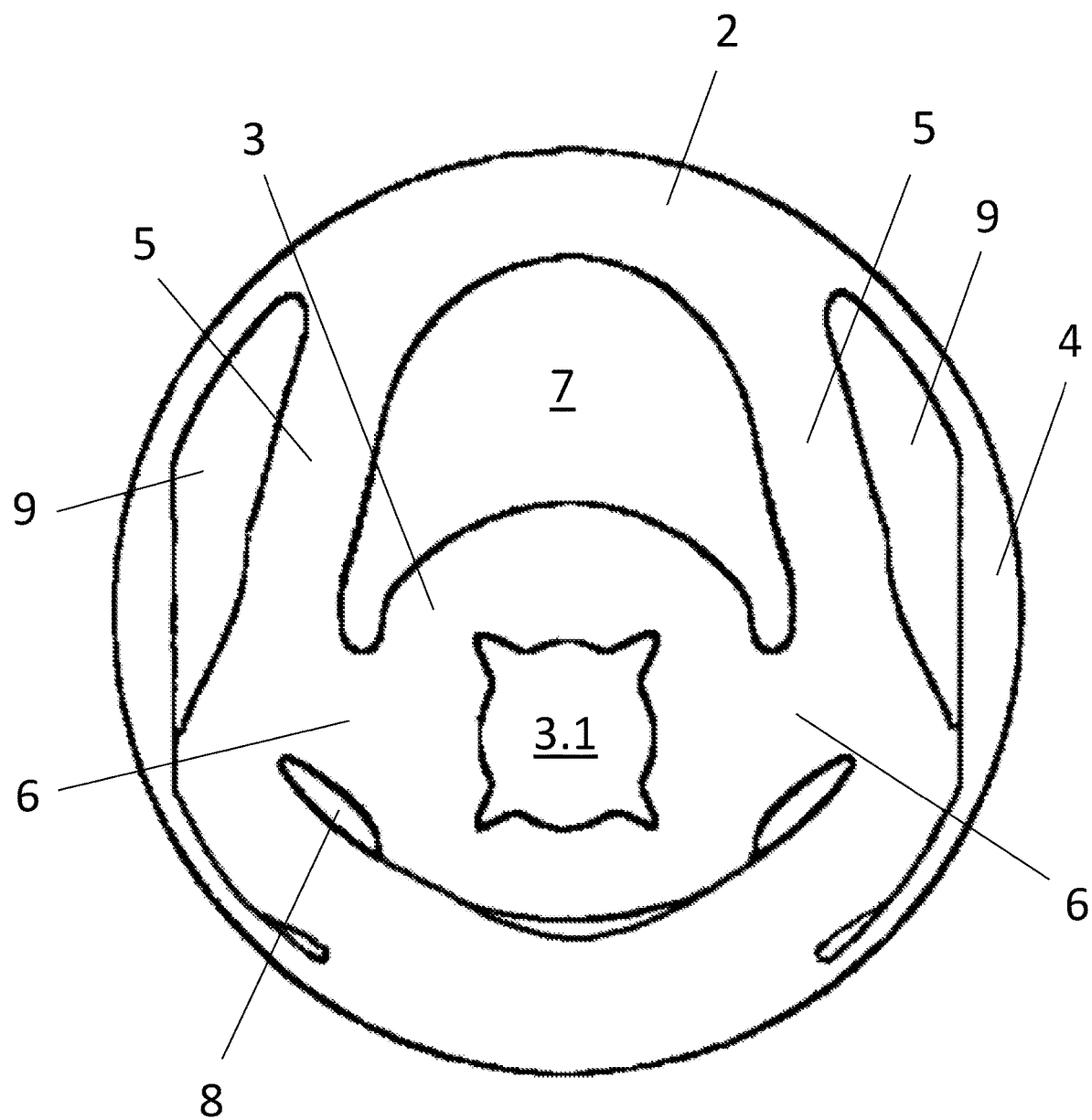
FIG. 6 shows an image of the simulation of an example of the behavior in use of the isolator of FIG. 1 when the central member has been moved to the lower position.
Figure 7:
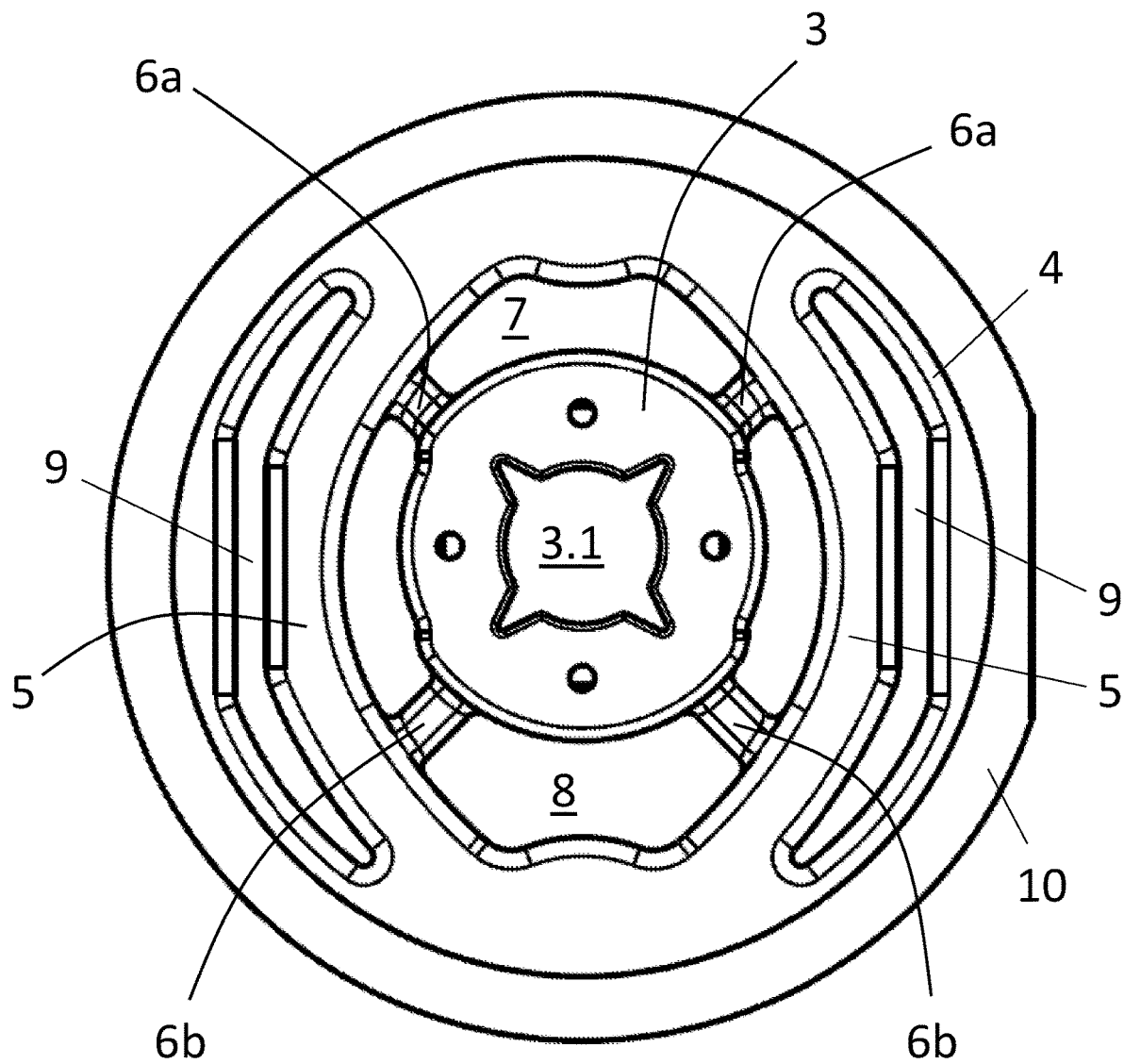
FIG. 7 shows another embodiment of an automotive exhaust system isolator.

The upper and lower buffer holes 7 and 8, and lateral buffer holes 9 allow support arms 5 to deform when the isolator 1 is in use, changing temporarily their shape. FIG. 6 shows an image of the simulation of an example of the behavior of the isolator 1 when it is in use. In this example, the central member 3 has been moved to the lower position of the isolator 1. In FIG. 6 can be seen that the upper buffer hole 7 and the upper part of the lateral buffer holes 9 have been enlarged allowing the upper part of the respective support arms 5 to be also enlarged, i.e. tensioned, while the lower buffer hole 8 and the lower part of the lateral buffer holes 9 having been almost disappeared, allowing the lower part of the respective support arms 5 to be shortened, i.e. compressed.

The fact that the upper buffer hole 7, the lower buffer hole 8 and the lateral buffer holes 9 are through holes that run through the elastomeric body 2 from side to side allow to dissipate the high temperature that concentrates near the isolator 1 when it is in use due to the high temperatures at which the exhaust system works.

The inner side of the upper part of the peripheral member 4, preferably where the first ends 5.1 of the respective support arms 5 are joined, comprise a limiting protrusion 13 as shown in FIG. 3, which makes the upper buffer hole 7 to be narrower in the symmetry vertical plane.

In the same way, the inner side of the lower part of the peripheral member 4, preferably where the second ends 5.2 of the respective support arms 5 are joined, comprise a limiting protrusion 14 as shown in FIG. 3, which makes the lower buffer hole 8 to be narrower in the symmetry vertical plane.

The limiting protrusions 13 and 14 limit the displacement of the central member 3 when the isolator 1 is in use in the vehicle. This is advantageous in order not to exceed an undesired deformation of the support arms 5 so that the threshold of the yield point of the elastomeric body 2 is not exceeded. In addition, the maximum displacement of the exhaust system is also limited, avoiding any undesired contact of the exhaust system with the surrounding components of the vehicle. The simulation of FIG. 6 has been made without the limiting protrusions 13 and 14.

As best shown in FIG. 3, each of the lateral buffer holes 9 comprises a straight section 17, i.e. a section which is parallel to the direction of the supporting load, represented in FIG. 3 by arrow D, exerted by the hanged exhaust system, i.e. in the vertical direction, preferably located in the middle zone of the corresponding lateral buffer hole 9. This allows the deformation of the corresponding support arm 5 to be the desired one, although there is lack of space, allowing the maximum displacement of the central member 3. Said maximum displacement of the central member 3 is achieved when the central member 3 contacts against the upper or lower part of the peripheral member 4 (the isolator 1 being in the use position), covering all stroke between upper and lower buffer holes 7 and 8. If the peripheral member 4 comprises the limiting protrusions 13 and 14, then the maximum displacement of the central member 3 would be achieved when the central member 3 contacts against any of those limiting protrusions 13 or 14.

Therefore, the straight section 17 of the lateral buffer holes 9 guarantees that the corresponding support arm 5 does not collapse against the wall of the corresponding lateral buffer hole 9 before the central member 3 contacts against the peripheral member 4 or the limiting protrusions 13 or 14. To achieve this, the gap of the respective lateral buffer holes 9 would have to be wide enough and sometimes it might require an enlargement of the peripheral member 4. Sometimes this may not be possible due to lack of space, but thanks to the straight section 17 of the lateral buffer holes 9, the maximum displacement of the central member 3 is guaranteed without enlarging the isolator 1.

According to the preferred embodiment of the invention, the outermost surface of the peripheral member 4 is surrounded by an outer rigid sleeve 10. The outer sleeve 10 is able to couple to the vehicle body directly or through another component, not shown in the drawings, which is suitable for being attached to the vehicle body.

As shown in FIG. 1, 2 or 3, the outer sleeve 10 comprises a radially extending protrusion 15, preferably ring shaped, at one of its ends having a recess 15a in a lateral side. This recess 15 allows the correct assembly of the isolator 1 in the vehicle. The correct position of the isolator 1 to be assembled is the one shown in FIG. 3, i.e. the one on which the lower buffer hole 8, which in the use position and the rest position is bigger than the upper buffer hole 7, is located in the lower part of the elastomeric body 2.

In the preferred embodiment the elastomeric body 2 is over-molded in said outer sleeve 10 but other ways of joining the outer sleeve 10 and the elastomeric body 2 are not ruled out, for example by press-fit.

Figure 4:
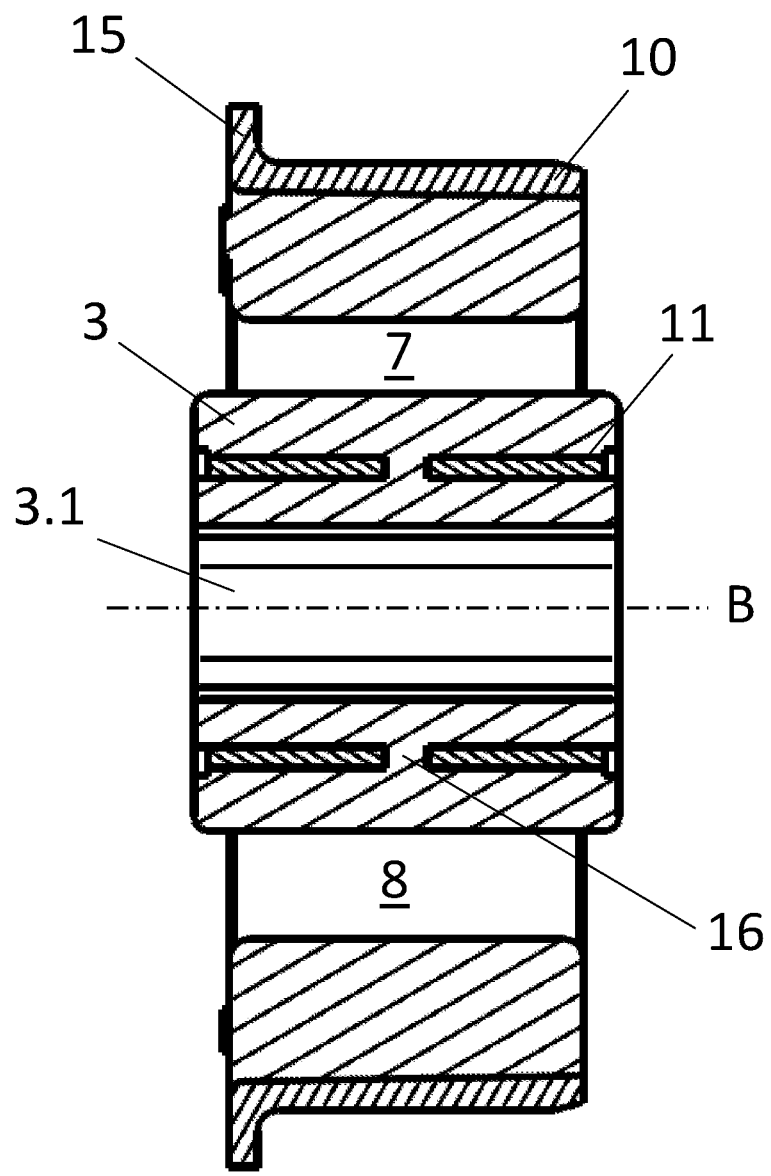
FIG. 4 shows section A-A of FIG. 3.
Figure 5:
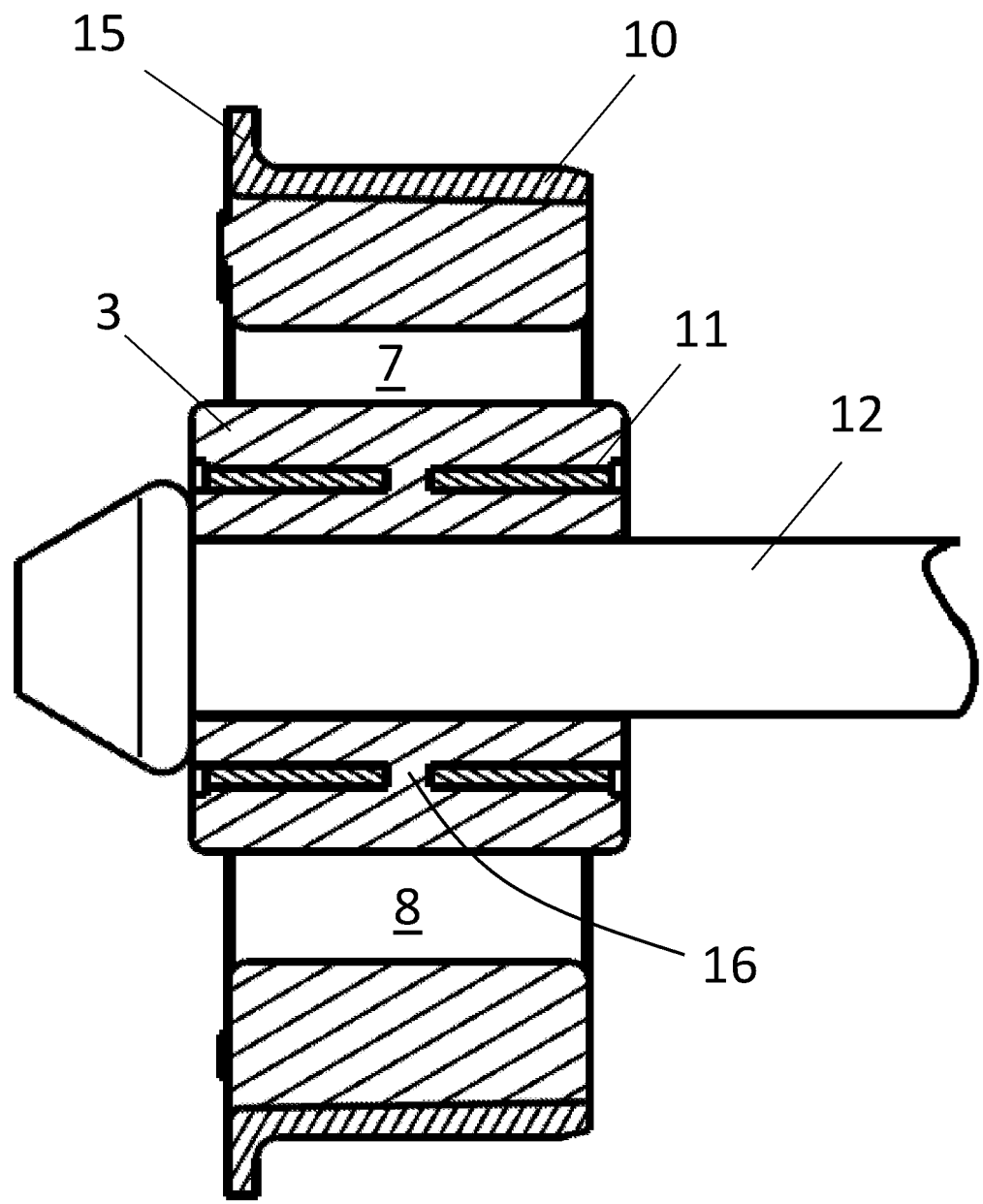
FIG. 5 shows section A-A of FIG. 3 but with the pin of the exhaust system.

The central member 3 of the isolator 1 of the invention comprises an embedded rigid inner sleeve 11 as shown in FIG. 3 or 4. Said inner sleeve 11 comprises a plurality of holes 16, as shown for example in FIG. 4, to allow the pass of the elastomeric material towards the inner area of the inner sleeve 11 in the manufacturing process.

The outer sleeve 10 and the inner sleeve 9 are preferably metallic, such as aluminum or steel, but can also be plastic such as polyamide and they allow the isolator 1 to withstand not only the weight of the exhaust system but also the loads (static and dynamics such as swinging loads) exerted by said exhaust system during use.

The following clauses disclose in an unlimited way additional embodiments.

Clause 1. An automotive exhaust system isolator comprising an elastomeric body (2) comprising a central member (3) having a through hole (3.1) for inserting a pin (12) of an exhaust system, and a peripheral member (4) surrounding the central member (3) and connected to said central member (3), the peripheral member (4) being configured to be coupled to a vehicle body, the elastomeric body (2) further comprises two support arms (5) having a first end (5.1) end a second end (5.2), the first and second ends (5.1, 5.2) of the respective support arms (5) being joined to the peripheral member (4), and the central member (3) being connected to the two support arms (5) by means of respective lateral bridges (6), so that, in use, the first ends (5.1) of the support arms (5) are positioned in an upper part of the peripheral member (4) and the second ends (5.2) are positioned in a lower part of the peripheral member (4), the central member (3) being positioned between both support arms (5).

Clause 2. The isolator according to clause 1, wherein the support arms (5) have a C shape and an inverted C shape respectively, so that each support arm (5) partially surrounds the central member (3).

Clause 3. The isolator according to clause 2, wherein the first ends (5.1) of the two support arms (5) are joined to each other in the upper part of the peripheral member (4).

Clause 4. The isolator according to clause 2 or 3, wherein the second ends (5.2) of the two support arms (5) are joined to each other in the lower part of the peripheral member (4).

Clause 5. The isolator according to any of the preceding clauses, wherein the lateral bridges (6) are joined to the center of the respective support arms (5).

Clause 6. The isolator according to any of the preceding clauses, wherein the lateral bridges (6) are joined to the center of the central member (3).

Clause 7. The isolator according to any of clauses 1 to 4, wherein each support arm (5) and the central member (3) are joined by means of two lateral bridges (6a and 6b), so that, in use, one lateral bridge (6a) is joined to an upper part of the central member (3) and to an upper part of the respective support arm (5), the second lateral bridge (6b) being disposed below the first bridge (6).

Clause 8. The isolator according to any of the preceding clauses, wherein the central axis (B) of the central member (3) is disposed, in a use position and in a stable position, above the central axis (C) of the peripheral member (4).

Clause 9. The isolator according to any of the preceding clauses, wherein, in a use position and in a stable position, the isolator (1) is symmetric with respect to a vertical plane.

Clause 10. The isolator according to any of the preceding clauses, wherein the elastomeric body (2) comprises an upper buffer hole (7) formed between the upper portions of both support arms (5), a lower buffer hole (8) formed between the lower portions of both support arms (5) and lateral buffer holes (9) formed between the peripheral member (4) and the corresponding support arm (5).

Clause 11. The isolator according to clause 10, wherein in a use position each of the lateral buffer holes (9) comprises a vertical straight section (17), preferably located in the middle zone of the corresponding lateral buffer hole (9).

Clause 12. The isolator according to any of the preceding clauses, wherein in a use position the first end (5.1) of each support arm (5) is located within a segment of the upper part of the peripheral member (4) between 0° and 45° from a central vertical axis.

Clause 13. The isolator according to any of the preceding clauses, wherein in a use position the second end (5.2) of each support arm (5) is located within a segment of the upper part of the peripheral member (4) between 0° and 45° from a central vertical axis.

Clause 14. The isolator according to any of the preceding clauses, wherein the outermost surface of the peripheral member (4) is surrounded by an outer rigid sleeve (10).

Clause 15. The isolator according to any of the preceding clauses, wherein the central member (3) comprises an embedded rigid inner sleeve (11).

What is claimed is:

1. An exhaust system isolator for an automotive vehicle, the automotive vehicle having a body, the exhaust system isolator comprising:
   an elastomeric body including:
   a central member having a through hole that is configured to receive an inserting of a pin of an exhaust system of the automotive vehicle;
   a peripheral member surrounding the central member and connected to the central member, the peripheral member being configured to be coupled to the automotive vehicle body;
   a first support arm extending along a first side of the central member, the first support arm having a first end and a second end that is each joined to the peripheral member, the first end of the first support arm being located in an upper part of the peripheral body, the second end of the first support arm being located in a lower part of the peripheral body;
   a second support arm extending along a second side of the central member, the second side being opposite the first side, the second support arm having a first end and a second end that is each joined to the peripheral member, the first end of the second support arm being located in the upper part of the peripheral body, the second end of the second support arm being located in a lower part of the peripheral body, the central body being located between the first and second support arms;
   a first lateral bridge that connects the central member to the first support arm; and
   a second lateral bridge that connects the central member to the second support arm;
   a portion of each of the first and second support arms is configured to deform upon a supporting load being applied to the central member.

2. The exhaust system isolator according to claim 1, wherein the first support arm has a C shape and the second support arm has an inverted C shape.

3. The exhaust system isolator according to claim 2, wherein the first end of the first support arm is joined to the first end of the second support arm in the upper part of the peripheral member.

4. The exhaust system isolator according to claim 2, wherein the second end of the first support arm is joined to the second end of the second support arm in the lower part of the peripheral member.

5. The exhaust system isolator according to claim 3, wherein the second end of the first support arm is joined to the second end of the second support arm in the lower part of the peripheral member.

6. The exhaust system isolator according to claim 1, wherein the first lateral bridge is joined to a center of the first support arm and the second lateral bridge is joined to a center of the second support arm.

7. The exhaust system isolator according to claim 1, wherein the first lateral bridge is joined to a center of the first side of the central member and the second lateral bridge is joined to a center of the second side of the central member.

8. The exhaust system isolator according to claim 6, wherein the first lateral bridge is joined to a center of the first side of the central member and the second lateral bridge is joined to a center of the second side of the central member.

9. The exhaust system isolator according to claim 1, wherein one of the first and second lateral bridges is joined to an upper part of the central member and to an upper part of a respective one of the first and second support arms, the other of the first and second lateral bridges being disposed below the one of the first and second lateral bridges joined to the upper part of the central member and to the upper part of the respective one of the first and second support arms.

10. The exhaust system isolator according to claim 1, wherein, in a use and stable position, a horizontal central axis of the central member is disposed above a horizontal central axis of the peripheral member.

11. The exhaust system isolator according to claim 1, wherein, in a use and stable position, the elastomeric body has a plane of symmetry extending vertically through a center of the central member.

12. The exhaust system isolator according to claim 1, wherein the elastomeric body includes an upper buffer hole and a lower buffer hole, the upper buffer hole being formed between an upper portion of the first support arm and an upper portion of the second support arm, the lower buffer hole being formed between a lower portion of the first support arm and a lower portion of the second support arm.

13. The exhaust system isolator according to claim 12, wherein the elastomeric body includes a first lateral buffer hole located on the first side of the central member and a second lateral buffer hole located on the second side of the central member, the first lateral buffer hole being formed between the peripheral member and the first support arm, the second lateral buffer hole being formed between the peripheral member and the second support arm.

14. The exhaust system isolator according to claim 13, wherein each of the first and second lateral buffer holes includes a vertical straight section.

15. The exhaust system isolator according to claim 14, wherein the vertical straight section of each of the first and second lateral buffer holes is located in a respective central portion of the first and second lateral buffer holes.

16. The exhaust system isolator according to claim 1, wherein the first end of each of the first and second support arms is located within a segment of the upper part of the peripheral member between 0° and 45° from a central vertical axis of the elastomeric body.

17. The exhaust system isolator according to claim 1, wherein the second end of each of the first and second support arms is located within a segment of the lower part of the peripheral member between 0° and 45° from a central vertical axis of the elastomeric body.

18. The exhaust system isolator according to claim 16, wherein in the use position the second ends of each of the first and second support arms is located within a segment of the lower part of the peripheral member between 0° and 45° from the central vertical axis of the elastomeric body.

19. The exhaust system isolator according to claim 1, wherein the outermost surface of the peripheral member is surrounded by a rigid sleeve.

20. The exhaust system isolator according to claim 1, further comprising a rigid sleeve embedded in the central member.

\* \* \* \* \*